Jan. 27, 1925.  1,524,585
A. E. SHUTTERLY
DISPENSING APPARATUS
Filed March 20, 1924
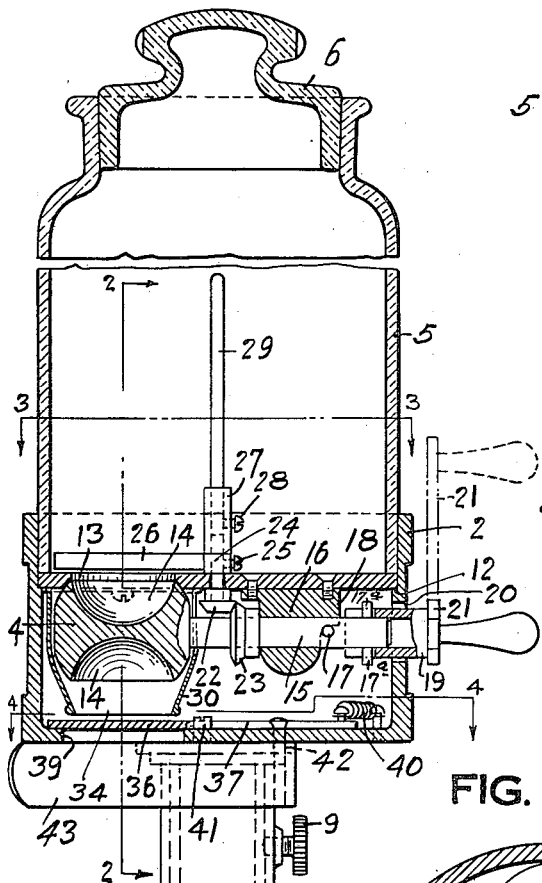
FIG. 1
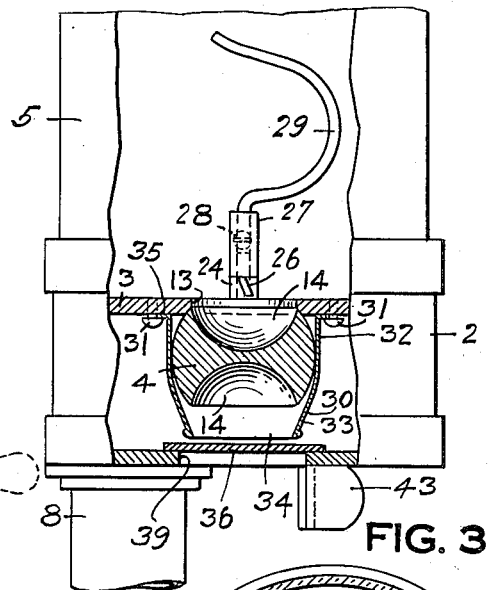
FIG. 2
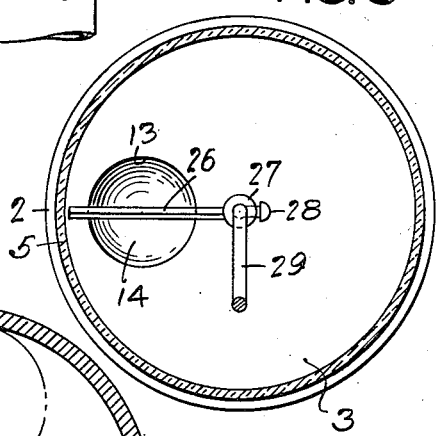
FIG. 3
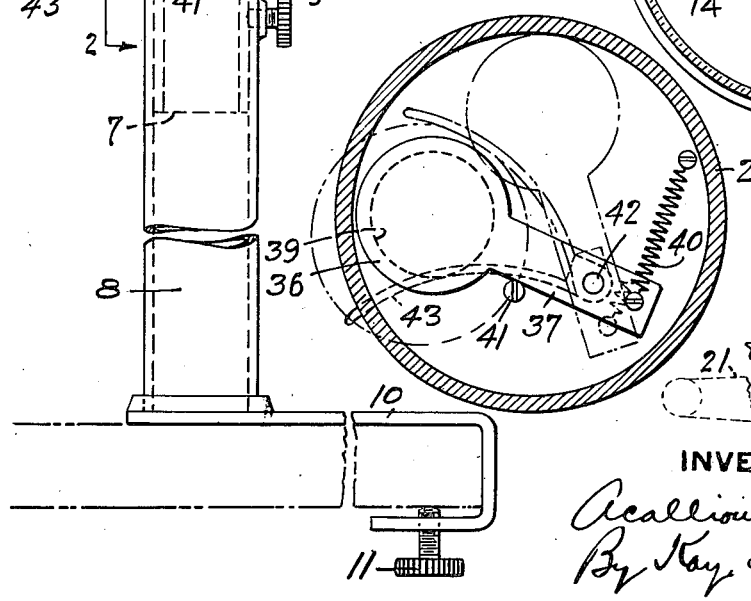
FIG. 4
FIG. 5
INVENTOR
Acallious E. Shutterly
By Kay, Totten & Brown.
Attorneys

Patented Jan. 27, 1925.

1,524,585

UNITED STATES PATENT OFFICE.

ACALLIOUS E. SHUTTERLY, OF PITTSBURGH, PENNSYLVANIA.

DISPENSING APPARATUS.

Application filed March 20, 1924. Serial No. 700,571.

*To all whom it may concern:*

Be it known that I, ACALLIOUS E. SHUTTERLY, a citizen of the United States, and resident of Pittsburgh, in the county of Allegheny and State of Pennsylvania, have invented a new and useful Improvement in Dispensing Apparatus; and I do hereby declare the following to a full, clear, and exact description thereof.
My invention relates to apparatus for dispensing powdered, granular or fragmentary material such as malted milk, coffee, peanuts and any other such materials that are dispensed from containers in measured quantities.

The object of my invention is to provide dispensing apparatus of the character indicated which shall be of simple and rugged construction, and which shall operate to deliver accurately measured quantities of material in a positive manner and without waste, while preserving the main supply of material from access of air and moisture.

The novel feature of principal importance in this apparatus consists of a measuring and delivering device in the form of a spherically curved body provided with one or more circular measuring depressions, preferably two in number, and preferably arranged opposite to each other, this device being arranged closely adjacent to a circular opening which communicates with a supply of the material to be dispensed. The spherical form of the measuring device causes this device to fit closely at all times, the edges of the outlet opening and insures that the material shall be delivered properly and without exposing the main body of the material to the air.
Other novel features of importance include a wiper which is arranged to sweep adjacent to the inner wall of the container and over the discharge outlet, an agitator also arranged within the container to move simultaneously with the movements of the measuring device, and a shutter which normally closes the outlet in the casing through which the material is discharged, this shutter being arranged to be removed from such opening when a glass or other receptacle is moved into position to receive a portion of material from the apparatus.

This apparatus is designed particularly, although not exclusively, for use in dispensing malted milk at soda fountains. Malted milk is usually sold to the dealer in powdered form and must be kept in tightly closed containers in order to maintain its solubility, and also in order to maintain its powdered condition. It is customary to serve malted milk as an ingredient in various kinds of soda-fountain drinks, and for this purpose it is measured out in suitable quantities, ordinarily two teaspoonfuls. This has ordinarily been done by dipping a spoon into a jar or can of the malted milk, and the exposure of the contents of the container to the air causes the malted milk to deteriorate, and is also objectionable for sanitary reasons. Devices have been designed for mechanically dispensing this material at soda fountains, but the devices of this kind which have heretofore been in commercial use have not been satisfactory because of the inaccuracy with which they measure the successive portions, and also because of the ease with which the material may be wasted by tampering with or idly operating the apparatus.

According to my present invention I avoid all of these objections, and I also obtain other advantages which will appear below, by the use of the apparatus shown in the accompanying drawing, in which—

Fig. 1 is a side elevational view, with parts in section, of a complete apparatus constructed in accordance with my invention; Fig. 2 is a side view taken at right angles to Fig. 1, with parts broken away and with other parts in section on the line 2—2, Fig. 1; Fig. 3 is a plan view, with parts in section on the line 3—3, Fig. 1; Fig. 4 is a plan view, with parts in section on the line 4—4, Fig. 1; and Fig. 5 is a detail view of the limit-stop device.

The principal parts of this device include a casing 2, a horizontal plate or false bottom 3 mounted removably within the casing 2 and spaced above the bottom thereof, a measuring and delivering device or ball 4 mounted with its operating mechanism beneath the plate 3, and a bottomless container 5, which may suitably be an ordinary confectioner's glass jar, having a stopper 6 and having its bottom cut off so as its side walls rest directly upon the plate 3.

Secured to the bottom of the casing 2, and at one side of its center, is a depending tubular member 7 which fits into the upper end of a tubular member 8 and is clamped therein in any desired position of vertical and horizontal adjustments by means of a set-screw 9. The support 8 suitably consists of a section of tubing, the lower end of which is mounted on a U-shaped clamp 10 provided with a set screw 11 for attaching the entire device to any suitable support such as a table, the ledge of a soda fountain or the like.

The plate 3 rests upon a ledge 12 which, when the casing 2 is circular, may suitably be formed by boring out the upper part of the casing to a slightly larger diameter than the lower part of the casing, and making the plate 3 of suitable diameter to fit within the larger upper diameter of the casing. The plate 3 is provided with an outlet opening 13, the under edges of which are beveled to conform to the spherical curvature of the measuring and discharging device 4. This measuring and discharging device, as shown, is provided with two opposite and spherically curved depressions 14, each of which is of proper diameter to fit the opening 13 of the plate 3, and is of suitable capacity to contain one portion of the material to be dispensed. The body of the device 4 is mounted on a horizontal shaft 15 which is rotatably carried in a bearing 16 that is secured to the under side of the plate 3. The shaft 15 is provided with a lug 17 which may suitably be formed by piercing the shaft transversely to admit a pin which extends from one side of the shaft sufficiently to form the lug 17. This lug operates as a stop to limit the rotation of the shaft to alternate half-revolutions in opposite directions. For this purpose the lug 17 engages a projection 18 extending from the bearing 16. A crank 19 is inserted through an opening 20 in the casing 2 and is provided with slots which fit over the ends of a transverse pin 17ª and is thereby coupled to the shaft 15. The crank 19 is preferably so arranged with respect to the shaft 15 and the measuring device 4 that when one of the depressions 14 of the measuring device is in registry with the opening 13 in the plate 3, the arm 21 of the crank is about horizontal or slightly below the horizontal. The weight of the crank thus assists in bringing the shaft to its limit of movement in each direction, so that the measuring device always stops with one of its depressions 14 in proper registry with the opening 13 in the plate 3, even though the operator may not have turned the crank sufficiently to bring the parts to this position.

The plate 3 is provided with a central opening through which extends a short vertical shaft, the lower end of which carries a bevel pinion 22 meshing with a bevel gear 23 that is secured to the horizontal shaft 15. The vertical shaft carries a collar 24 that is clamped to the vertical shaft by means of a set-screw 25, and the collar 24 carries a horizontal wiper 26 which moves with the vertical shaft and close to the upper surface of the plate 3.

When the measuring device 4 is in the position where one of its openings 14 registers with the opening 13 in the plate 3, the wiper 26 occupies a central position above the opening 13, as best shown in Fig. 3. When the horizontal shaft 15 is turned by means of the crank 19 to give the measuring device a half-rotation, the wiper 26 makes a complete revolution, the diameter of the pinion 22 being one-half the diameter of the gear 23. This movement of the wiper 26 is opposite to the movement of that portion of the measuring recess 14 which, at the beginning of the movements of the parts, rises through the opening in the plate 3. If the parts, as seen on Fig. 3, are in such position that the next movement of the measuring device will raise the upper portion of the recess and depress the lower portion, the wiper 26 moves upwardly or in a clock-wise direction, as seen in Fig. 3, thereby pushing aside the material above the rising portion of the measuring recess. Similarly, when the parts are in such position that the lower part of the measuring recess rises, as seen on Fig. 3, the wiper descends or moves in a counter-clockwise direction as seen in this figure. It will be seen that the wiper 26 is somewhat inclined from the vertical position, to enable the wiper to cut through the subdivided material more easily. The position of the wiper near the plate 3 enables the wiper to sweep the material into the measuring depressions when only a small amount of material remains in the container.

The central vertical shaft also carries a sleeve 27, in which is adjustably secured, by means of a set-screw 28, an agitator 29 which may have the curved form best shown on Fig. 2, and which serves to agitate the contents of the container each time that a portion of material is discharged therefrom.

In order to prevent the material from escaping laterally from the measuring device while that device is rotating, I provide a shield 30 which may suitably be pressed from sheet metal and which is removably secured to the underside of the plate 3 by means of screws 31 or otherwise. This shield, as shown, has a cylindrical portion 32, a downwardly tapering portion terminating in an opening 34 of substantially the same diameter as the measuring depressions 14, and a flange 35 which fits beneath the plate 3.

A shutter 36, suitably consisting of a circular disc of metal having a lateral arm 37, is pivotally mounted on the bottom of the casing 2, and normally closes an opening 39 in the bottom of the casing which is directly beneath the openings 13 and 34. A spring 40 is connected between the end of the arm 37 and a fixed point within the casing 2, and tends to force the shutter 36 against a stop screw 41, in which position the shutter covers the opening 39. The pivot of the shutter 36 suitably consists of a pin 42 which extends down through and beyond the bottom of the casing, and carries a curved deflector 43 which when the shutter 36 closes the opening 39, is at one side of the opening 39 with its concave surface outward. When the deflector 43 has moved across the opening 39, this movement is communicated through the pivot pin 42 to remove the shutter 36 from above the opening 39, thus permitting a portion of material to escape from the apparatus when delivered by the measuring device 4.

In operation, the apparatus is assembled as shown in Fig. 1, with a supply of malted milk, or other material to be dispensed, in the container 5. When it is desired to serve a portion of the contents of the container, a glass or other receptacle is brought beneath the casing 2 in such a way as to move the deflector 43 across the opening, and the crank 19 is then turned as far as it will go. This causes the simultaneous movement of the measuring device 4, the wiper 26 and the agitator 29. The uppermost depression in the measuring device 4 has been filled with material by the weight of the material above it, and this charge is leveled off by means of the wiper 26 as the measuring device begins to turn. When the half-revolution of the measuring device is completed, it is stopped by engagement of the lug 17 with the projection 18 and the charge of material is discharged through the lower opening 34 of the shield and through the opening 39 in the bottom of the casing 2, into the glass or other receptacle which is held beneath. The same movement of the measuring device 4 brings uppermost the depression which, at the beginning of the operation, was at the bottom of the measuring device, and the depression thus brought uppermost immediately fills with material and is ready to deliver the next charge when the crank is given a half-revolution in a direction opposite to its first movement. Successive charges of material are thus delivered by alternating movements of the crank 19 in opposite directions.

The construction herein shown has the advantage that no great amount of material can be wasted by idly turning the crank, because the only effect of such operation is to discharge a few portions of material into the space within the shield or funnel 30. Such material is not allowed to fall out of the apparatus until the deflector 43 is pushed aside in the next regular operation of the apparatus.

The measuring device 4 may be made of aluminum, if desired, and all the exposed metal parts may suitably be nickel-plated, enameled or otherwise finished to give an attractive appearance.

In the foregoing description I have laid emphasis on the dispensing of malted milk. It will be understood, however, that numerous other materials may be dispensed by means of the same apparatus, and the principle of the spherical measuring device with its circular depressions may be employed both in hand-operated dispensers of the type herein shown, or in connection with the coin-controlled devices commonly used in dispensing peanuts or the like.

It will also be understood that, while I have shown and described herein a construction which I have found to be well adapted for carrying out my invention, various changes in the construction and arrangement of the parts may be made without departing from my invention as set forth in the appended claims.

I claim as my invention:

1. Dispensing apparatus comprising a container having a bottom member provided with an outlet opening, a rotatably movable measuring and delivering device mounted beneath said bottom member and having a plurality of circular measuring depressions, each adapted to register with said opening, a wiper, and means for moving said wiper toward and partially across said opening simultaneously with movement of one of said depressions into receiving position beneath the opening and for moving the wiper in the opposite direction when said depression is moved toward discharging position, the general direction of movement of the wiper when adjacent to said opening being substantially opposite to that of said depressions when adjacent to said opening.

2. Dispensing apparatus comprising a container having a bottom member provided with a circular outlet opening, a horizontal shaft mounted beneath said bottom member, a spherically curved measuring and delivering device connected to rotate with said shaft and having two circular measuring depressions arranged opposite to each other and adapted to register closely beneath said outlet opening, a crank for operating said shaft, means for limiting the movement of said shaft to half-revolutions in opposite directions, such movements of said shaft bringing the said depressions alternately into registry with said opening, a vertical shaft disposed centrally of said container, a wiper secured to said shaft and so mounted as to occupy a central position over said opening, closely adjacent to the upper edges of said depressions, when either of them is in registry with said opening, and gearing connecting said horizontal shaft with said vertical shaft.

In testimony whereof I, the said ACALLIOUS E. SHUTTERLY, have hereunto set my hand.

ACALLIOUS E. SHUTTERLY.